United States Patent
Lallement et al.

(10) Patent No.: US 10,850,577 B2
(45) Date of Patent: Dec. 1, 2020

(54) TIRE COMPRISING A PASSIVE TRANSPONDER AND METHOD FOR READING THE DATA

(71) Applicant: COMPAGNIE GENERALE DES ETABLISSEMENTS MICHELIN, Clermont-Ferrand (FR)

(72) Inventors: Philippe Lallement, Clermont-Ferrand (FR); Julien Destraves, Clermont-Ferrand (FR); Frédéric Marques, Clermont-Ferrand (FR); Michel Blondelet, Clermont-Ferrand (FR); Johan Desmoulin, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 266 days.

(21) Appl. No.: 15/760,357

(22) PCT Filed: Sep. 15, 2016

(86) PCT No.: PCT/EP2016/071826
§ 371 (c)(1),
(2) Date: Mar. 15, 2018

(87) PCT Pub. No.: WO2017/046245
PCT Pub. Date: Mar. 23, 2017

(65) Prior Publication Data
US 2018/0264898 A1    Sep. 20, 2018

(30) Foreign Application Priority Data
Sep. 18, 2015   (FR) ...................................... 15 58819

(51) Int. Cl.
*B60C 23/04*    (2006.01)
*H01Q 1/36*    (2006.01)
*H01Q 1/22*    (2006.01)

(52) U.S. Cl.
CPC ...... *B60C 23/0449* (2013.01); *B60C 23/0408* (2013.01); *B60C 23/0493* (2013.01);
(Continued)

(58) Field of Classification Search
CPC ...................... B60C 23/0491; B60C 23/0493
(Continued)

(56) References Cited

U.S. PATENT DOCUMENTS

| 4,442,438 A * | 4/1984 | Siwiak ..................... H01Q 9/27 |
| | | 343/792 |
| 4,941,523 A * | 7/1990 | Galante .................... B60O 5/14 |
| | | 152/510 |

(Continued)

FOREIGN PATENT DOCUMENTS

| EP | 0 505 905 A1 | 9/1992 |
| EP | 1 977 912 A1 | 10/2008 |

(Continued)

OTHER PUBLICATIONS

Wikipedia, Dipole antenna, Jan. 1, 2014 (Year: 2014).*
(Continued)

*Primary Examiner* — Robert C Dye
*Assistant Examiner* — Farah Taufiq
(74) *Attorney, Agent, or Firm* — Venable LLP

(57) ABSTRACT

A pneumatic tire has a passive transponder incorporated therein that allows communication with a radio-frequency reader located outside the pneumatic tire. The passive transponder includes at least one radiating antenna and is embedded in an electrically insulating elastomeric blend to form a patch. The patch extends axially between an axially
(Continued)

inner end of a carcass ply of the pneumatic tire and an inner surface of the pneumatic tire. The patch also extends radially at a distance between a bead toe of the pneumatic tire and a radially outer end of a bead core of the pneumatic tire.

16 Claims, 5 Drawing Sheets

(52) U.S. Cl.
CPC ......... *H01Q 1/2225* (2013.01); *H01Q 1/2241* (2013.01); *H01Q 1/362* (2013.01)

(58) Field of Classification Search
USPC ...................................................... 152/152.1
See application file for complete search history.

(56) References Cited

U.S. PATENT DOCUMENTS

| | | | | |
|---|---|---|---|---|
| 5,181,975 | A * | 1/1993 | Pollack | ............... B60C 23/0493 |
| | | | | 152/152.1 |
| 5,500,065 | A * | 3/1996 | Koch | ................. B60C 23/0493 |
| | | | | 156/123 |
| 8,072,336 | B2 * | 12/2011 | Uehara | ..................... B60C 1/00 |
| | | | | 257/687 |
| 9,114,671 | B2 | 8/2015 | Adamson et al. | .. B60C 23/0493 |
| 9,679,174 | B2 | 6/2017 | Destraves et al. | ........................... |
| | | | | G06K 7/10425 |
| 9,754,138 | B2 | 9/2017 | Destraves et al. | ........................... |
| | | | | G06K 7/10128 |
| 2007/0074799 | A1 * | 4/2007 | Nakane | ................. B60C 15/024 |
| | | | | 152/510 |
| 2017/0057304 | A1 * | 3/2017 | So | ........................ B60C 23/0493 |
| 2017/0059435 | A1 | 3/2017 | Marques et al. | ........ G01L 17/00 |
| 2017/0341323 | A1 | 11/2017 | Destraves et al. | ........................... |
| | | | | B29D 31/0061 |
| 2017/0358150 | A1 | 12/2017 | Destraves | .............. G07C 5/008 |
| 2018/0174015 | A1 | 6/2018 | Destraves | |

FOREIGN PATENT DOCUMENTS

| | | |
|---|---|---|
| EP | 2 186 658 A1 | 5/2010 |
| EP | 2 873 540 A1 | 5/2015 |

OTHER PUBLICATIONS

Nov. 25, 2016 International Search Report and Written Opinion in International Patent Appln. No. PCT/EP2016/071826.
International Search Report issued by WIPO dated Nov. 25, 2016, in connection with International Application No. PCT/EP2016/071826 (in French; English translation is attached).
Written Opinion published by WIPO dated Mar. 23, 2017, in connection with International Application No. PCT/EP2016/071826 (in French; no English translation presently is available).
Wikipedia, "Loop antenna", https://en.wikipedia.org/wiki/Loop_antenna#..text=Magnetic vs.-,electrical antennas,electric field of the wave, Jul. 2020, pp. 1-10.

* cited by examiner

TIRE COMPRISING A PASSIVE TRANSPONDER AND METHOD FOR READING THE DATA

FIELD OF THE INVENTION

The present invention relates to pneumatic tires for heavy vehicles or construction equipment provided with identification and communication devices, and the communication methods of such objects.

TECHNOLOGICAL BACKGROUND

For the field of identification and communication devices, RFID (acronym for Radio Frequency Identification) passive radio frequency transponders are conventionally used, in particular for tires. These devices allow for a more reliable and quicker automated management of the objects by facilitating the identification, monitoring and management thereof. Some devices, provided with advanced functions, also make it possible to obtain physical quantities of the object such as temperature or inflation pressure in the case of tires, guaranteeing the proper use of these objects during the life cycle thereof. Hereafter, all of these devices will be referred to by the generic term "passive communication electronic device" or "passive transponder".

These passive communication electronic devices are generally made up of at least one electronic chip and an antenna formed by a magnetic loop or a radiating antenna which is fixed to the object to be identified. Depending on the communication radio frequency band and the interrogation distance for these electronic devices, one or the other of the antennas is preferred. Conventionally in the tire industry, the communication frequency band is the UHF (acronym for Ultra High Frequencies) band for far-field interrogations with respect to these passive transponders requiring the use of a radiating antenna. The UHF band corresponds to the communication frequencies between 300 megahertz and 3 gigahertz.

The integration of such communicating electronic devices in the pneumatic tire must meet certain requirements. Firstly, since the pneumatic tire is subjected to strong thermomechanical stresses, the integration of a communicating electronic device must not produce a loss in the endurance of the pneumatic tire or of the electronic device and, in particular, of the radiating antenna. Secondly, the communication performance of the electronic device must be sufficient in order to easily interrogate the electronic device regardless of the conditions of use, in particular from outside the pneumatic tire.

Thus, the site of the communicating electronic device must satisfy these constraints. Firstly, the integration in a zone of low thermomechanical stresses of the pneumatic tire is preferable in order not to produce high strains on the electronic device. In particular, since pneumatic tires for construction equipment are subjected to severe conditions of driving on any type of road or route, there are increased risks of puncture or of loss of inflation pressure causing the pneumatic tire to go flat. In these cases of use, the site of the electronic device must not further damage the pneumatic tire. In addition, an area without excessive electromagnetic interference caused by the presence of metal in the pneumatic tire is preferable for radiocommunication performance.

Known from the state of the art, in particular from the patent EP 1977912 B1, is a pneumatic tire provided with such a UHF passive communication electronic device that can be interrogated in the far field. The device is housed between two masses of insulating rubber of suitable rigidity before being positioned inside the pneumatic tire on the outer part of the pneumatic tire relative to the metal carcass ply. This position is favourable to the radio frequency communication performance of the passive transponder by not inserting a metal zone between the radio frequency reader and the passive transponder.

However, this electronic device is still in a zone of high mechanical stresses leading to the use of specific radiating antennas. Moreover, the electronic device, arranged in this way, is not completely protected from mechanical damage associated with the projection of various objects which can be encountered under severe driving conditions on a route. Finally, this technical solution is only possible by directly incorporating the electronic device during the manufacture of the pneumatic tire.

Similarly, the patent application EP 2873540 A1 proposes a communicating electronic device meeting these technical constraints. The electronic device is integrated in the bottom zone of the tire subjected to levels of lesser mechanical deformations than the crown block or the sidewall. More precisely, it is radially positioned above the bead core and is fixed to the inner wall of the pneumatic tire. This zone makes it possible to effectively protect the electronic device from shocks generated by objects propelled onto the pneumatic tire during use.

However, the electronic device of this document is not a UHF passive transponder which can be interrogated by a reader placed outside the tire.

The objective of the present invention is to propose a pneumatic tire provided with a passive communication electronic device operating, for example, in the far field in the UHF frequency range and meeting the use and communication constraints of pneumatic tires for heavy vehicles and construction equipment.

The reading of the following description will be easier by introducing the following definitions. The reference axis in this case means the axis of rotation of the pneumatic tire. The vertical direction is the direction normal to the surface of contact between the pneumatic tire and the ground under the condition of use of the pneumatic tire moving away from the ground. The pneumatic tire center is the intersection between the reference axis and the median plane of the pneumatic tire. This geometric point corresponds to the origin of the axes.

The axial direction will be the direction parallel to the reference axis moving away from the pneumatic tire center towards the outer side of the pneumatic tire, where the standardizing markings of the tire are inscribed. The radial direction is a direction perpendicular to the reference axis moving away from the reference axis. The circumferential direction is the direction orthogonal to the axial and radial directions. The azimuth of a geometric point is the angle formed by the vertical and radial directions.

DESCRIPTION OF THE INVENTION

The subject matter of the invention a pneumatic tire provided with a passive transponder. The pneumatic tire is of toroidal form, defining at any point the axial, radial and circumferential directions with respect to a center of the pneumatic tire, having a radially inner surface and a radially outer surface and comprising a crown, two sidewalls and two beads. Each bead has at least one annular bead core that rotates about a reference axis defining the axial direction from the center of the pneumatic tire, at least one carcass ply of toroidal form, at least one inner liner, and at least one protector. This protector of toroidal form is made up of at least one elastomeric blend layer placed radially inwardly of the bead core, the carcass ply and the inner liner. This protector has a first end, located axially inwardly and radially outwardly, and a second end called a bead toe located axially inwardly and radially inwardly. The passive transponder comprises at least one metal strand, forming a radiating antenna, defining a longitudinal axis and capable of creating an electrical coupling with an electronic chip. The longitudinal axis is positioned substantially perpendicular to the threads of the carcass ply. The passive transponder is embedded in an electrically insulating elastomeric blend in order to form a patch. This patch has, on the periphery thereof, a first face sited axially outwardly with respect to the pneumatic tire center, and a second face sited axially inwardly, which are substantially perpendicular to the reference axis. This patch also defines a first end located radially inwardly, and a second end located radially outwardly, respectively, relative to the reference axis which corresponds to the minimum distance, and the maximum distance, respectively, between the patch and the reference axis. This pneumatic tire is characterized in that at least one of the faces of the patch extends axially between the axially inner end of the carcass ply and the inner surface of the pneumatic tire and in that at least one of the ends of the patch extends radially at a distance between that of the bead toe and that of the bead core radially-outer end.

According to a particular embodiment, the passive radio frequency transponder communicates via radio waves at a frequency belonging to the UHF band.

The term "inner liner" means an airtight rubber layer in contact with the air of the internal cavity of the pneumatic tire. In the case of pneumatic tires for heavy vehicles or construction equipment, the carcass ply generally includes metal reinforcing threads.

In contrast to the teaching of the cited documents from the prior art, the positioning of a UHF passive transponder according to the invention allows the latter to communicate well with a radio frequency reader located outside the pneumatic tire in spite of the close metal masses and allows excellent protection against all the thermomechanical stresses of the pneumatic tire.

This site also permits the use of a less sophisticated radiating antenna since the thermomechanical strains, to which it must be subjected, are less.

The term "electrical coupling" in this case means the transfer of electrical energy between two media regardless of whether this transfer is achieved by electrical connection, induction or electromagnetic radiation.

The frequency band of the ultra high frequencies thus far makes it possible to obtain the best possible compromise between the radiating antenna size and the quality of the radio communication when the antenna is enveloped in elastomeric blends.

Preferably, the electrical coupling between the radiating antenna and the electronic chip requires an additional antenna electrically connected to the electronic chip and inductively coupled to the radiating antenna.

In this case, the endurance of the electronic device according to the invention is improved since the mechanical connections between the electronic chip and the radiating antenna are removed. Thus, the thermomechanical stresses to which the radiating antenna is subjected do not produce high mechanical strains on the rest of the electronic device.

According to a preferred embodiment, the radiating antenna of the passive transponder is a half-wave dipole antenna.

This type of antenna makes it possible to obtain a large coverage of area in a plane, for example the radial plane of a radial pneumatic tire, since the field radiated by this type of antenna resembles an omnidirectional plane wave perpendicular to the axis of the antenna. In addition, it is also an antenna that is simple to produce due to the monodirectional geometry thereof.

Preferably, the radiating antenna of the electronic device is of helical form.

Thus, the mechanical endurance of the electronic device is increased by facilitating mechanical deformations of the radiating antenna without impacting upon the operation thereof. Although positioned in a zone of low thermomechanical stresses under the condition of use, the incorporation of the electronic device in the pneumatic tire before the shaping or curing operations can cause the radiating antenna to be subjected to substantial thermomechanical deformations that it withstands more easily through this geometric form.

Advantageously, the patch includes an electrically insulating elastomeric blend thickness between 1.5 and 5 millimeters, preferably between 2 and 4 millimeters.

Thus, the electronic device, and in particular the radiating antenna, is electrically insulated from any conductive material that would disturb the sending of the radio frequency waves between the UHF reader and the radiating antenna. The term "electrically insulating" in this case means that the electrical conductivity of the elastomeric blend is below the percolation threshold of the conductive fillers of the blend.

Preferably, the distance between the axially outwardly-located face of the patch and the radiating antenna of the passive transponder is at least 1 millimeter.

The face defined in this case must be the geometric part of the patch that is the most deeply anchored within the pneumatic tire. Incorporating a minimum thickness of electrically insulating material according to this dimension, between the radiating antenna of the passive transponder and the elastomeric blends of the pneumatic tire containing conductive fillers such as, for example, carbon black, ensures correct operation of the radiating antenna with respect to the radio waves with which it communicates. This feature therefore increases the communication performance of the passive transponder.

In a particular embodiment, the distance between the axially inwardly-located face of the patch and the radiating antenna of the passive transponder is at least 0.5 millimeters.

The axially inwardly-located face of the patch corresponds to the zone least enveloped by the conductive fillers of the elastomeric blends of the pneumatic tire. Thus, a thickness of 0.5 millimeters of electrically insulating elastomer is then sufficient to ensure normal operation of the radiating antenna of the electronic device with respect to the electrical interferences generated by the conductive fillers thereof.

In a preferred embodiment, since the electronic chip is connected to a printed circuit to form an electronic board, the printed circuit includes other additional active or passive electronic components.

Thus, the functions of the passive transponder are augmented by the addition of components such as a memory or sensors of any kind. The data of the electronic board being interrogated or sent by the radiating antenna.

Preferably, the radially inwardly-located end of the patch is located radially at a distance, at least five millimeters, from the bead toe of the protector.

Thus, the endurance of the electronic device is increased since the zone of contact between the rim and the pneumatic tire, which zone is potentially highly stressed during the use of the pneumatic tire, is not the place for fitting the electronic device.

According to a preferred embodiment, the patch is fixed, at the axially outwardly-located face, on the inner surface of the pneumatic tire.

Thus, the electronic device contained in the patch can be inserted into the pneumatic tire after the manufacture thereof. As a result, the mechanical specifications of the components of the electronic device are more flexible allowing the use of simpler and less expensive technical solutions.

According to a very specific embodiment, the patch is positioned on the inner surface of the pneumatic tire between the bead toe and the radially outwardly- and axially inwardly-located end of the protector.

In this case, the patch is fixed entirely on a single component of the pneumatic tire, in this case the protector, which makes it possible to chemically and mechanically homogenize the entire bond between the pneumatic tire and the patch. Therefore, by avoiding the zones of connection with different components such as, for example, the inner liner and the protector, the mechanical endurance of the bond between the patch and the pneumatic tire is increased.

Preferably, the patch can be made up of an elastomeric blend comprising at least one of the following elements: natural rubber, butyl and ethylene propylene diene monomer.

In the case of construction pneumatic tires which can be brought into contact with Tire Life, the patch is advantageously based on ethylene propylene diene monomer. This elastomer is, indeed, resistant to the constituent glycol of this Tire Life.

According to a particular embodiment, the patch is fixed to the internal surface of the tire by a bonding rubber having a thickness of at least 0.5 millimeters.

Another object of the invention is a method for reading the data contained in a passive transponder incorporated in a pneumatic tire mounted on a metal wheel and inflated, comprising the following steps:

Pinpointing, on the pneumatic tire, the angular position for fitting the passive transponder;

Positioning a radio frequency reader comprising a radiating antenna in a perpendicular manner to the outer surface of the pneumatic tire by positioning the radiating antenna at a distance less than or equal to 20 centimeters, preferably less than or equal to 10 centimeters and very preferably less than or equal to 5 centimeters from the outer surface at the radial plane for fitting the passive transponder;

Radially scanning the outer surface from the mid-height of the pneumatic tire towards the reference axis; and Recording the information sent by the passive transponder in response to the interrogation signal of the radio frequency reader.

According to a particular embodiment, the radiating antenna of the radio frequency reader is positioned in contact with the external surface of the pneumatic tire.

In this case, the reading system and the radiating antenna of the radio frequency reader are configured at the operating frequency of the passive transponder enveloped in an electrically insulating elastomeric blend. Thus, reading from outside the pneumatic tire is possible, whereas a person skilled in the art does not expect to receive, regardless of the power emitted by the radio frequency reader and permissible according to the ETSI 302 208 standard, response signals from the passive transponder having placed the patch in this geographic zone of the pneumatic tire.

The angular position of the passive transponder can be pinpointed manually or automatically by means of specific marking on the pneumatic tire or by any means for detecting the passive transponder, such as, for example, X-rays.

The positioning and the scanning of the radio frequency reader on the outer surface of the pneumatic tire are manual or automated.

This reading protocol allows, firstly, for far-field location with respect to the passive transponder and, secondly, for modification of the distance of the path of the radiocommunication waves by approximately the wavelength of these waves. This makes it possible to find an optimum distance between the radio frequency reader and the passive transponder minimizing the harmful effects of the reflection of the radio waves on the conductive materials.

The distance between the radiating antenna of the radio frequency reader and the outer surface of the pneumatic tire influences the intensity of the direct and reflected radio waves that reach the passive transponder. Depending on the activation energy required for this passive transponder, which activation energy is determined by the sensitivity of the electronic chip in particular, it is possible to modulate the distance between the radio frequency reader and the pneumatic tire. For an energy-efficient electronic chip, and a lowly-dissipative pneumatic tire, the data from the passive transponder can be read up to a distance of 20 centimeters from the surface of the pneumatic tire. However, the positioning of the radiating antenna of the radio frequency reader in contact with the outer surface of the pneumatic tire is a preferred condition in terms of sending energy.

BRIEF DESCRIPTION OF THE DRAWINGS

The invention will be better understood on reading the following description of the drawings. These descriptions are given solely by way of example and with reference to the appended figures, in which.

DETAILED DESCRIPTION OF EMBODIMENTS

In the following, the terms "tire" and "pneumatic tire" are used in an equivalent manner and relate to any type of pneumatic or non-pneumatic tire.

Figure 1:
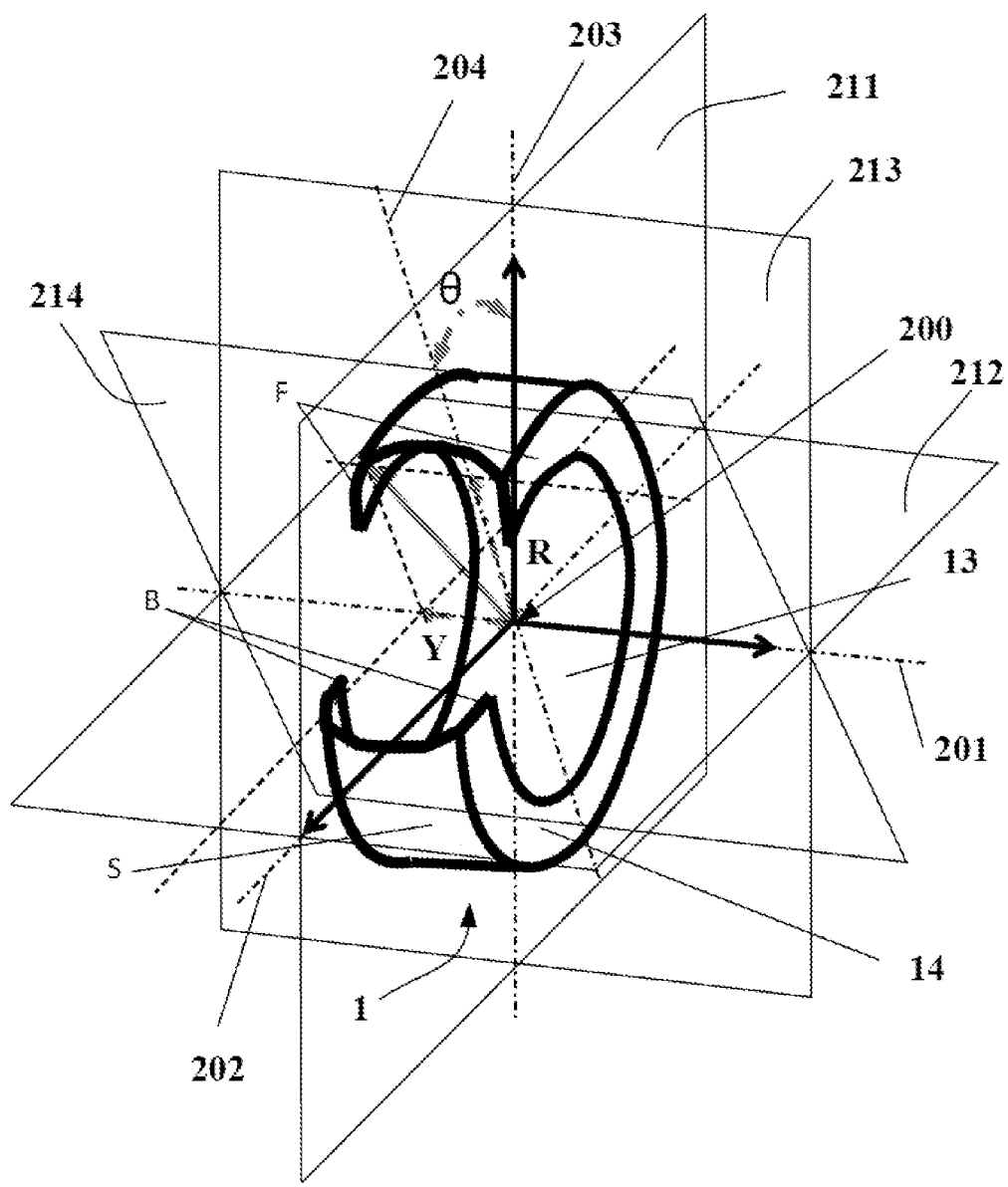
FIG. 1 shows a three-dimensional section of a pneumatic tire.

FIG. 1 shows a section of a pneumatic tire 1 according to the invention comprising a crown S extended by two sidewalls F and ending in two beads B. In this case, the tire 1 is intended to be mounted on a vehicle wheel 8 of heavy vehicle or construction equipment type, which is not shown in this figure, at the two beads B. A closed cavity C is thus delimited, that contains at least one pressurized fluid, and is delimited both by the inner surface 13 of the pneumatic tire 1 and the outer surface of the wheel 8 of the vehicle.

The reference axis 201 corresponding to the natural axis of rotation of the pneumatic tire and the median plane 211, perpendicular to the reference axis 201 and equidistant from the two beads, will be noted. The intersection of the reference axis 201 with the median plane 211 determines the pneumatic tire center 200. A Cartesian coordinate system will be defined at the pneumatic tire center 200, made up of the reference axis 201, a vertical axis 203 perpendicular to the ground and a longitudinal axis 202 perpendicular to the other two axes. Furthermore, the axial plane 212 passing through the reference axis 201 and the longitudinal axis 202, parallel to the plane of the ground and perpendicular to the median plane 211, will be defined. Finally, the plane perpendicular to both the median plane 211 and to the axial plane 212 passing through the vertical axis 203 will be called the vertical plane 213.

Any physical point of the pneumatic tire 1 is solely defined by the cylindrical coordinates (Y, R, θ) thereof. The scalar Y represents the axial distance to the pneumatic tire center 200 in the direction of the reference axis 201, defined by the orthogonal projection of the physical point of the tire 1 on the reference axis 201. A radial plane 214 forming an angle θ with respect to the vertical plane 213 about the reference axis 201 will be defined. The physical point of the pneumatic tire 1 is pinpointed in this radial plane 214 by the distance R to the pneumatic tire center in the direction perpendicular to the reference axis 201, identified by the orthogonal projection of this physical point on the radial axis 204.

Figure 2:
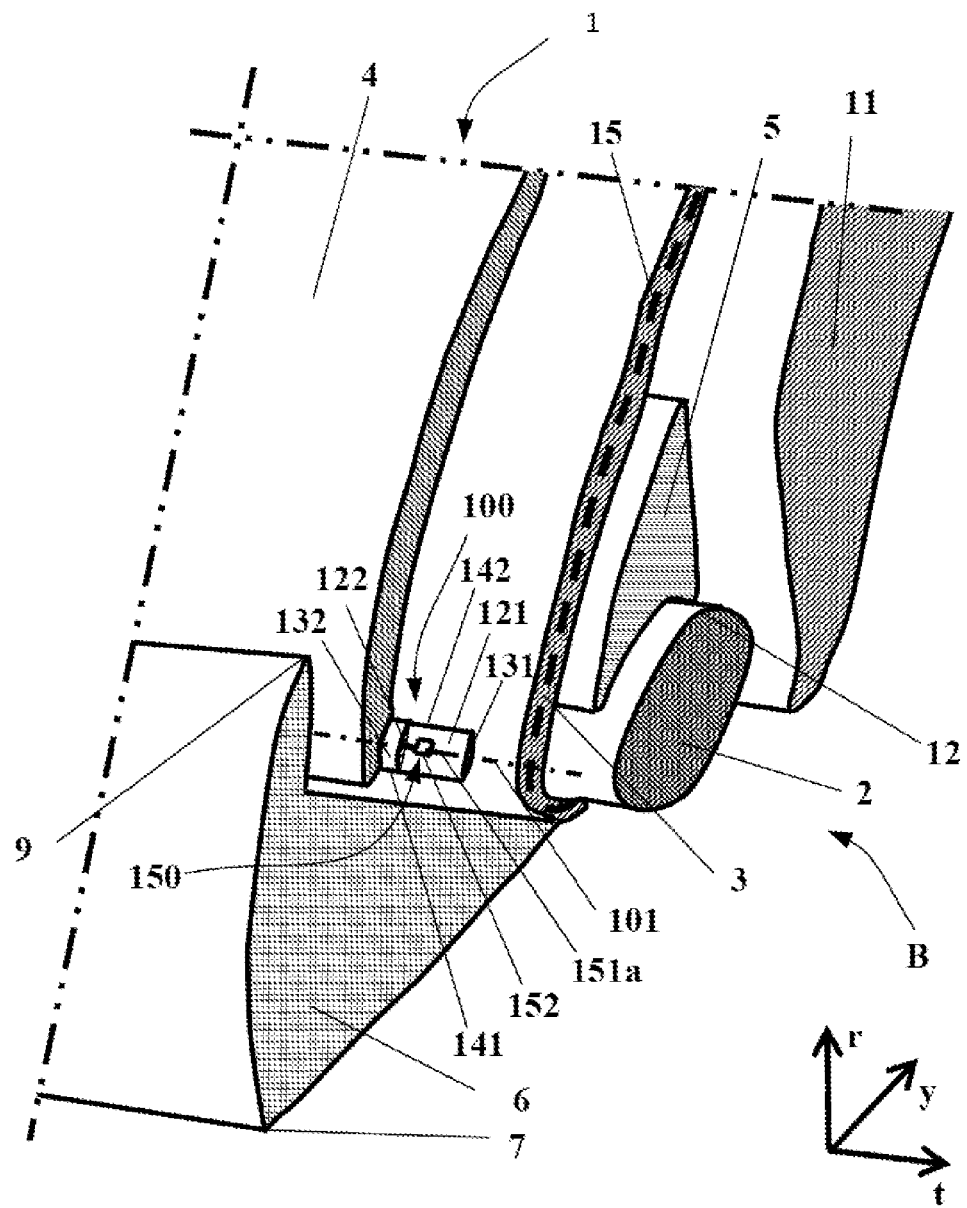
FIG. 2 shows a perspective view in the rotating frame of reference with tear-outs at the bottom zone of a pneumatic tire according to the invention.

FIG. 2 shows a perspective view with tear-out of a bead B, which view is observed from the cavity C of the pneumatic tire 1 according to the invention. This bead B comprises a metal annular bead core 2 and various elastomeric components, including a carcass ply 3, an inner liner 4, a protector 6, an apex 5 and a sidewall 11. The orientation of the metal reinforcing threads 15 of the carcass ply 3 is indicated by the dotted lines. The threads 15 are, in this case, oriented radially, and this corresponds to a radial pneumatic tire 1. The bead toe 7 and the radially outer and axially inner end 9 of the protector 6 are clearly seen. This pneumatic tire also has a patch 100 including a passive transponder 150 comprising a radiating antenna 151 made up of two metal strands of equal length, one strand of which is shown as 151a, and at least one electronic chip 152 coupled to the radiating antenna 151 and coated by a rigid and electrically insulating mass 180 based, for example, on epoxy resin. The longitudinal axis 101 of the patch 100 is defined by the axis of the radiating antenna 151 of the electronic device 150. In this pneumatic tire 1 example, the patch 100 is positioned circumferentially. The patch 100 comprises, owing to the tear-out, a first mass 121 and a second mass 122 made of electrically insulating elastomeric material of a rigidity suited to the elastomeric components of the bead B enveloping the electronic device 150. In this case, the axially outer face 131 of the patch 100 is positioned on the carcass ply 3. Axially, this face 131 is located at the minimum of the axial positions of the carcass ply 3. Radially, the patch 100 lower 141 and upper 142 ends, according to the radial direction, are placed at a distance between that of the bead toe 7 and the bead core upper end 12. The patch 100 is covered by the inner liner 4 of the pneumatic tire 1 at the axially inner face 132. Thus, this example corresponds to the total insertion of a patch 100 comprising a passive transponder 150, inside the structure of the pneumatic tire 1.

Figure 3:
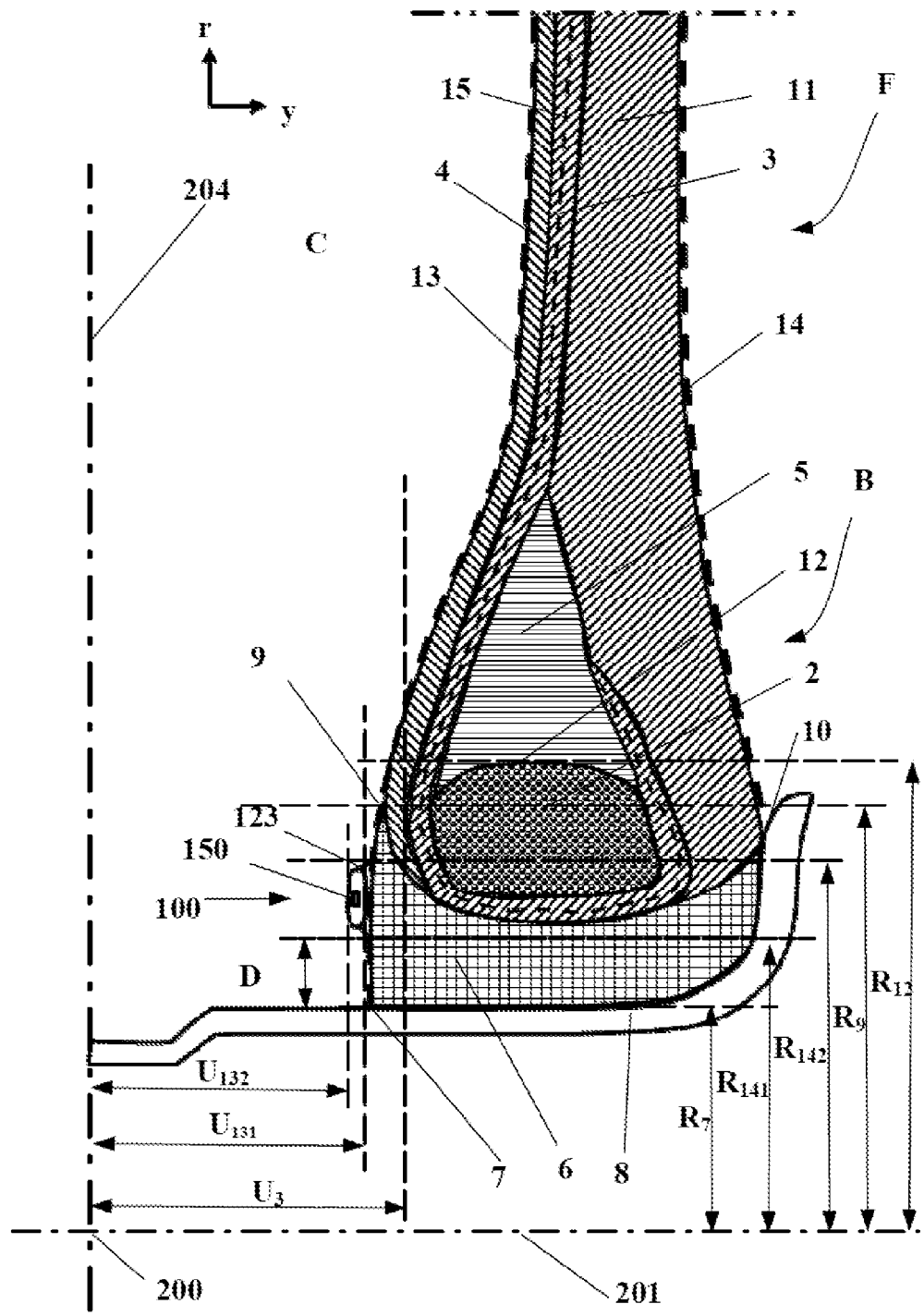
FIG. 3 shows a radial sectional view at the bottom zone of a pneumatic tire according to the invention.

FIG. 3 corresponds to a section in the radial plane 214 of a pneumatic tire 1 passing through the patch 100 at the bead B and a sidewall F part located below the mid-height of the pneumatic tire 1 where the section vertically ends. This pneumatic tire 1, mounted on a wheel 8 and inflated to the working pressure, comprises a metal annular bead core 2 and various elastomeric components including a carcass ply 3, an inner liner 4, a protector 6, an apex 5 and a sidewall 11. The orientation of the metal threads 15 of the carcass ply 3 is defined by the dotted lines. These threads 15 are positioned in the radial plane 214 corresponding to a radial tire.

The patch 100, the longitudinal axis 101 of which, defined by the radiating antenna 151, is, in this case of use, perpendicular to the radial plane 214, in this case comprises a passive transponder 150 embedded in an electrically insulating elastomeric blend, and a bonding rubber 123 partially covering the elastomeric blend. This bonding rubber 123 is positioned on the inner surface 13 of the pneumatic tire 1 at the protector 6. More precisely, it is located between a point of the bead toe 7 and the radially outer and axially inner end 9 of the protector 6 substantially at a radial distance D from the bead toe 7 in contact with the wheel 8. This distance D is obtained by the difference of the radial positions, between the radially lower end 141, denoted $R_{141}$, of the patch 100 and the bead toe 7, denoted $R_7$. The electrically insulating elastomeric blend, the rigidity of which, measured in Shore A, is between 30 and 80, is preferably made, in this case, of EPDM. The bonding rubber 123 is usually natural rubber-based. The axial position of the axially outer face 131 and axially inner face 132, respectively, denoted $U_{131}$ and $U_{132}$, respectively, of the patch 100 is defined as the average of the face axial distances obtained by orthogonal projection on the reference axis 201. In this case, the two faces 131 and 132 of the patch 100 are axially located at a distance less than the axially inner end of the carcass ply 3, denoted $U_3$, between the mid-height of the pneumatic tire 1 and the wheel 8. In the case herein, the two radially inner 141 and outer 142 ends of the patch 100 are located at a radial distance R between that of the bead toe 7, denoted $R_7$, and that of the radially outer- and axially inner-located end 9 of the protector 6, denoted $R_9$, while being less than the radial position of the bead core radially-outer end 12, denoted $R_{12}$.

Figure 4:
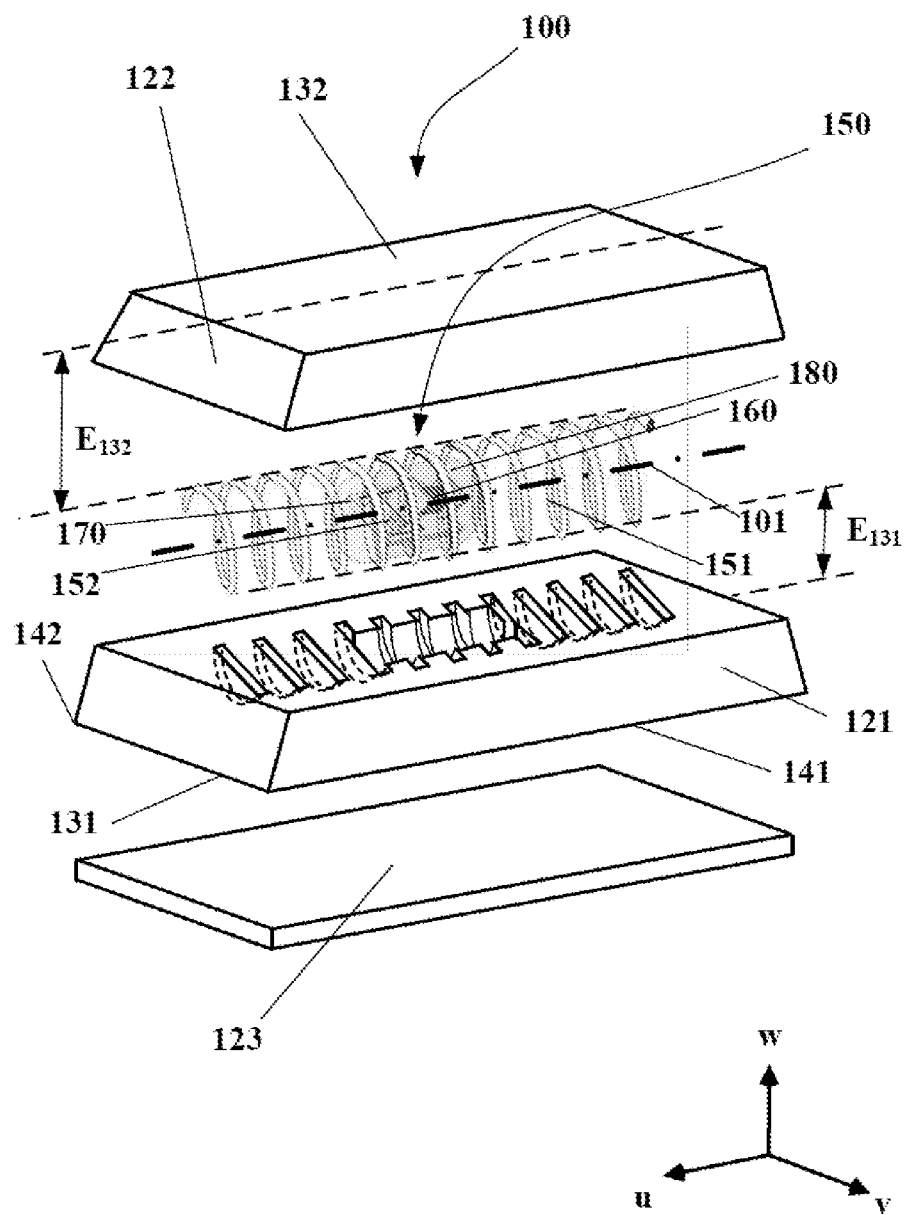
FIG. 4 shows an exploded view of a patch according to the invention.

FIG. 4 is a perspective exploded view of a patch 100 according to the invention. The patch 100 comprises, in this case, an electronic device 150 made up of a helical-form steel single-strand radiating antenna 151 defining a half-wave electric dipole. The orientation of the radiating antenna 151 represents the longitudinal axis 101 of the patch 100, denoted u. This radiating antenna 151 is connected by inductive coupling to an additional antenna 160 electrically connected to the electronic chip 152 via a printed circuit 170. The electronic chip 152, the additional antenna 160 and the printed circuit 170 are enclosed in a rigid and electrically insulating mass 180, for example made of an epoxy resin. The radiating antenna 151 is inserted, in this case, between a first mass 121 and a second mass 122, both made of an electrically insulating elastomeric blend, for example based on peroxide EPDM. The direction parallel to the thickness of these masses forms the vertical axis denoted w, the positive direction of which runs from the first mass 121 towards the second mass 122. Finally, the transverse axis, denoted v, is used in order to form a right trihedron with the axes u and w. If this patch is intended to be fitted in a radial pneumatic tire 1, the axially outer face 131 of the patch 100 is defined as the lower surface of the first mass 121 in the direction w. Similarly, the axially inner face 132 of the patch 100 in this case corresponds to the upper surface of the second mass 122 in the direction w. Furthermore, the radially inner end 141, and radially outer end 142, respectively, of the patch 100 is, in this case, made up by the lower edge of the first mass 121 in the positive direction, and negative direction, respectively, of the transverse axis v. Finally, the minimum distance, denoted $E_{131}$, is defined in this case by the difference in vertical position between the radiating antenna 150 and the axially outer face 131 of the patch 100. Similarly, the minimum distance, denoted $E_{132}$, is defined in this case by the difference in vertical position between the radiating antenna 150 and the axially inner face 132 of the patch 100. In the case of a radial tire, the longitudinal axis u, the transverse axis v and the vertical axis w of the patch 100 will be oriented along the circumferential axis 205, the radial axis 204 and the reference axis 201, respectively, of the pneumatic tire 1.

Figure 5:
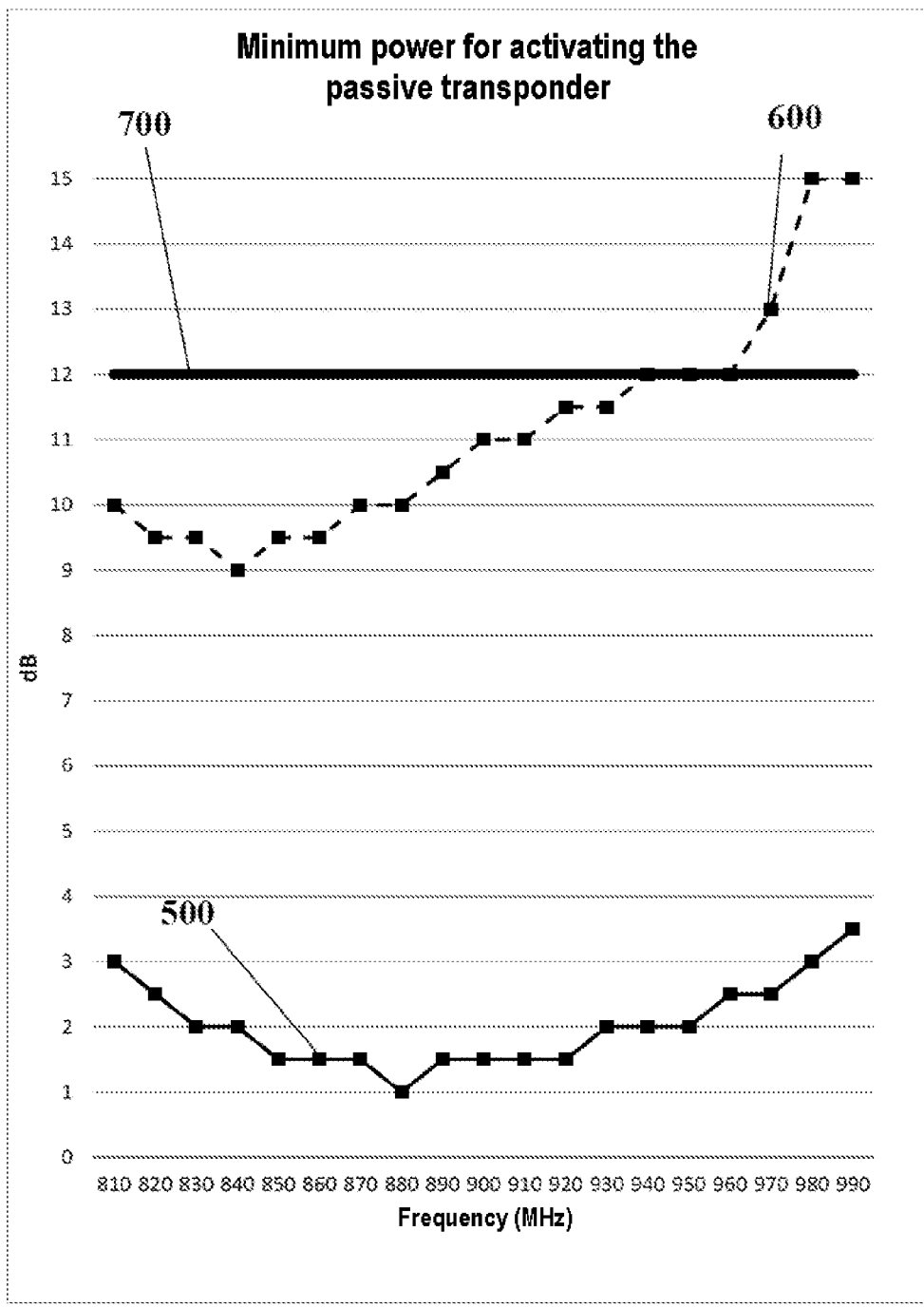
FIG. 5 shows a graph of the activation radio frequency power sent to a UHF passive transponder placed in the pneumatic tire according to the invention as a function of the observation frequency band.

FIG. 5 is a graph showing the power for activating the passive transponder 150 as a function of the frequency of the radio waves emitted by an interrogating antenna. For this purpose, a radio frequency reader, capable of emitting a prescribed radio frequency power that is constant over an extended frequency range around 900 MHz, is used. In accordance with the communication protocol according to the invention, the antenna of this radio frequency reader is in contact with the outer surface 14 of the pneumatic tire 1 mounted on a vehicle wheel 8 and inflated to the working pressure. The response of the passive transponder 150 is observed for each power level and each frequency for transmitting the radio waves. This graph shows on a logarithmic scale, expressed in decibels, the radio wave transmitting minimum power for activating the passive transponder 150 for the same interrogation distance. In the case herein, the passive transponder 150 used comprises a helical-form steel two-strand radiating antenna 151 of 50-millimeter length which is embedded in an electrically insulating EPDM-based blend having a thickness of 3.5 millimeters partially covered with a bonding rubber (123) of 0.5 millimeters. The patch 100, formed in this manner, placed perpendicular to the metal threads (15) of the carcass ply 3 of a radial pneumatic tire (1), of the Michelin brand with the size 59/80 R63, mounted on a 63-inch diameter flat-seat mounting steel wheel, is positioned on the inner surface 13 of this assembly mounted at a distance of 45 millimeters from the bead toe 7 and below the radially outer and axially inner end 9 of the protector 6. With regard to the installation and position uncertainties of the patch 100, it can be considered that the distance between the radio frequency transponder 150 and the interrogating antenna, placed on the outer surface 14 and at the tire 1 mid-height, is constant. The continuous curve 500 shows the transmission power required to activate a passive transponder 150 when the radiating antenna 151 is positioned at a distance of at least 1.5 millimeters from the axially outer face 131 of the patch 100. The dotted curve 600 is the radio frequency transmission power required to activate a passive transponder 150, the radiating antenna 151 of which is located at a distance of less than 0.5 millimeters from the axially outer face 131 of the patch 100. Finally, the curve 700 indicates the maximum permissible power according to the ETSI 302 208 standard.

Firstly, it is noted that at least four times more radiation power is required to activate the passive transponder 150 when the radiating antenna 151 thereof is not sufficiently buried inside the patch 100. This, then, also results in a disturbance of the resonance of the radiating antenna 151 of the passive transponder 150 which is offset by approximately 40 MHz between the two fitting configurations of the radiating antenna 151 as illustrated by the frequency position of the minimum of the curves 500 and 600. These examples show that interrogating a passive transponder 150 sited on the inner surface 13 of a pneumatic tire 1 at the protector 6 is possible while respecting the transmission radio frequency power standards. However, the communication performance of such a passive transponder 150 will be strongly influenced by the features of the patch 100 into which it is inserted.

The invention claimed is:

1. A pneumatic tire having a toroidal form, having axial, radial, and circumferential directions with respect to a tire center, and having a radially inner surface and a radially outer surface, the pneumatic tire comprising:
    a crown;
    two sidewalls extending from the crown;
    two beads respectively connected to the sidewalls, each bead including an annular bead core, the beads encircling a reference axis passing axially through the tire center, the reference axis being an axis of rotation of the pneumatic tire;
    a carcass ply having a toroidal form;
    an inner liner;
    for each bead, a protector having a toroidal form, the protector being made from at least one elastomeric blend and having a main portion located radially inward of the bead core of the corresponding bead, the carcass ply, and the inner liner, the protector including a first end located axially inward and radially outward of the main portion, and the protector including a second end located axially inward and radially inward of the first end, the second end forming a bead toe; and
    a passive transponder that includes an electronic chip and at least one metal strand forming a radiating antenna that is structured to enable electrical coupling to the electronic chip,
    wherein a longitudinal axis of the passive transponder is positioned substantially perpendicular to threads of the carcass ply,
    wherein the passive transponder is embedded in an electrically insulating elastomeric blend forming a patch,
    wherein the patch has, on a periphery thereof, a first face located axially outward with respect to the tire center, and a second face located axially inward with respect to the tire center, the first and second faces being substantially perpendicular to the reference axis,
    wherein the patch has, on the periphery thereof, a first end located radially inward relative to the reference axis, and a second end located radially outward relative to the reference axis, the first end and the second end defining a minimum distance and a maximum distance, respectively, between the patch and the reference axis,
    wherein at least one of the first and second faces of the patch is positioned at a position axially between an axially inner end of the carcass ply and the inner surface of the pneumatic tire,
    wherein at least one of the first and second ends of the patch is positioned at a position radially between the bead toe and a radially outer end of the bead core of one of the beads, and
    wherein the radiating antenna is a half-wave dipole antenna.

2. The pneumatic tire according to claim 1, wherein the passive transponder is a radio-frequency transponder that communicates via radio waves at a frequency within a UHF band of frequencies.

3. The pneumatic tire according to claim 1, wherein the electronic chip is electrically connected to an antenna that is structured to couple to the radiating antenna inductively.

4. The pneumatic tire according to claim 1, wherein the radiating antenna has a helical form.

5. The pneumatic tire according to claim 1, wherein a thickness of the electrically insulating elastomeric blend forming the patch is greater than or equal to 1.5 millimeters and less than or equal to 5 millimeters.

6. The pneumatic tire according to claim 1, wherein a distance between the radiating antenna of the passive transponder and the first face of the patch is at least 1 millimeter.

7. The pneumatic tire according to claim 1, wherein a distance between the radiating antenna of the passive transponder and the second face of the patch is at least 0.5 millimeters.

8. The pneumatic tire according to claim 1, wherein the electronic chip is electrically connected to a printed circuit of an electronic board, and the printed circuit includes at least one additional passive or active electronic component.

9. The pneumatic tire according to claim 1, wherein the first end of the patch is located radially at a distance of at least five millimeters from the bead toe of the protector.

10. The pneumatic tire according to claim 1, wherein the first face of the patch is fixed on the inner surface of the pneumatic tire.

11. The pneumatic tire according to claim 9, wherein the patch is positioned on the inner surface of the pneumatic tire between the bead toe and the first end of the protector.

12. The pneumatic tire according to claim 1, wherein the electrically insulating elastomeric blend forming the patch includes at least one of: natural rubber, a butyl, and an ethylene propylene diene monomer.

13. The pneumatic tire according to claim 11, wherein the patch is at least partially covered by a bonding rubber having a thickness of at least 0.5 millimeters.

14. The pneumatic tire according to claim 1, wherein the half-wave dipole antenna is oriented along the longitudinal axis for the passive transponder.

15. A method for reading data contained in a passive transponder incorporated in a pneumatic tire mounted on a metal wheel and inflated, the method comprising steps of:

positioning a radio-frequency reader, which includes a radiating reader antenna, relative to an outer surface of the pneumatic tire by positioning the radiating reader antenna at a distance less than or equal to 20 centimeters from the outer surface of the pneumatic tire at a radial plane corresponding to the passive transponder; and radially scanning the outer surface of the pneumatic tire from a mid-height of the pneumatic tire towards a reference axis, the reference axis passing axially through the tire center and being an axis of rotation of the pneumatic tire, wherein the pneumatic tire is the pneumatic tire according to claim 1.

16. The method according to claim 15, wherein, in the reading step, the radiating reader antenna is positioned to contact the outer surface of the pneumatic tire.

* * * * *